No. 813,445. PATENTED FEB. 27, 1906.
T. C. PATTERSON.
LATHE DOG.
APPLICATION FILED AUG. 14, 1903.
2 SHEETS—SHEET 2.
Fig. 5. Fig. 4.
Fig. 3.
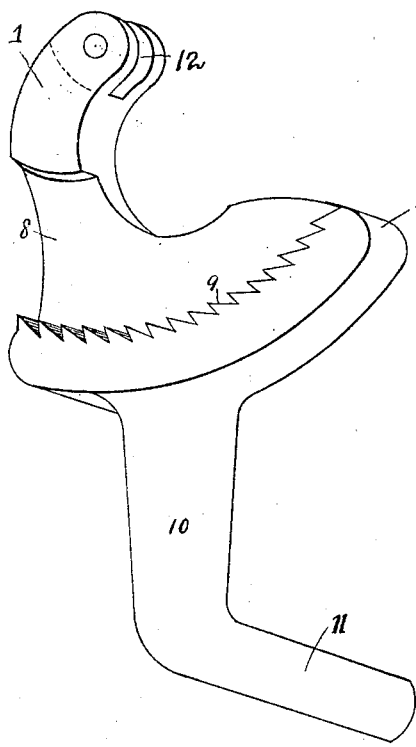
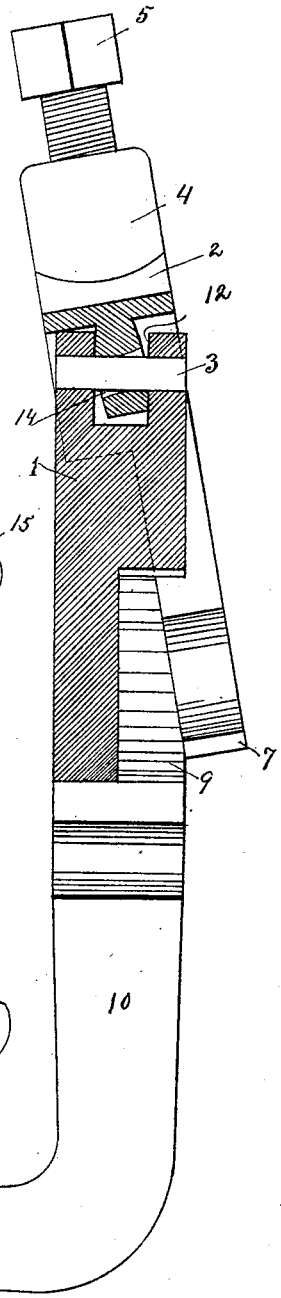
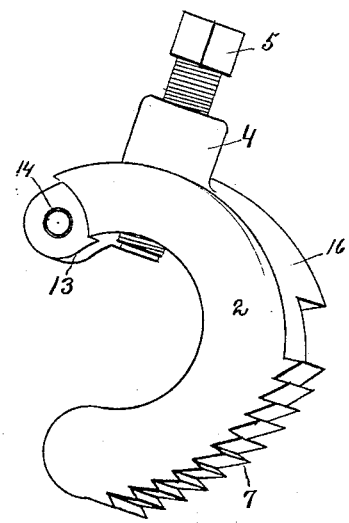
Witnesses.
Charles H Huig
B. C. Stickney.
Inventor.
Thomas C. Patterson.

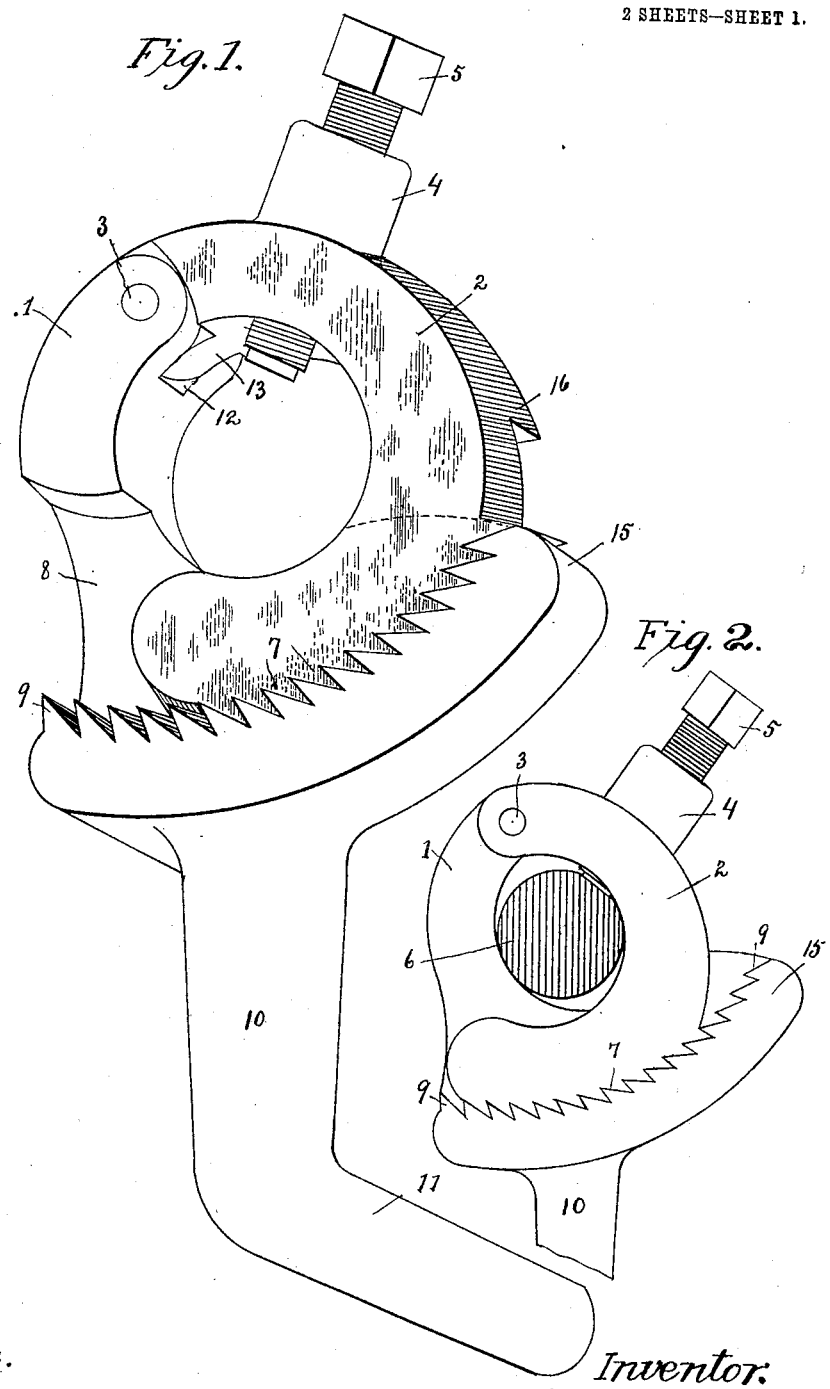

UNITED STATES PATENT OFFICE.

THOMAS C. PATTERSON, OF NEW YORK, N. Y.

LATHE-DOG.

No. 813,445.  Specification of Letters Patent.  Patented Feb. 27, 1906.

Application filed August 14, 1903. Serial No. 169,534.

*To all whom it may concern:*

Be it known that I, THOMAS C. PATTERSON, a citizen of the United States, residing in New York, in the county of New York and State of New York, have invented certain new and useful Improvements in Lathe-Dogs, of which the following is a specification.

My invention relates to that class of lathe-dogs in which two clamping members are pivoted together, one whereof is provided with a set-screw for holding the work; and its object is to simplify, strengthen, and otherwise improve the dog, and particularly to give it a stronger grip upon the work, enable it to hold a greater range of work, and to increase its durability.

In the drawings forming part of this specification, Figure 1 is a perspective view of my improved construction. Fig. 2 is a plan showing the dog holding a piece of work of small diameter. Fig. 3 is a view of one member of the dog detached. Fig. 4 is a view of the other member of the dog detached. Fig. 5 is a sectional view showing how the members of the dog may be moved relatively facewise to enable them to be set to different positions for clamping different kinds of work.

In the several views like signs denote like parts.

The dog comprises a pair of arms or legs 1 and 2, connected by a pivot 3. Upon the arm 2 is formed near said pivot a boss 4, into which is tapped a set-screw 5 for clamping the work 6. At its free end said arm is formed with a set of ratchet-teeth 7, cut upon an arc concentric with the pivot 3, said teeth consisting, preferably, of external or spur teeth. The other arm, 1, of the dog is formed with a depression 8, which receives the toothed or free end of the dog 2, and the outer wall of said depression is formed with internal ratchet-teeth 9, also cut upon an arc concentric with the pivot 3 and adapted to coöperate with the teeth 7 in the dog 2. Said arm 1 is also formed with a carrier-arm 10, which in some cases is provided with an elbow or lug 11.

It will be observed that each of the clamping-arms of the dog is curved or bowed, each bow forming about half of an annulus, or, in other words, the work-gripping surface of each bow being about semicircular or semicylindrical and that the set-screw 5 is so positioned and directed as to cause the work to bear against both of the arms or bows and at the same time to cause the work to force the two sets of teeth into interlocking engagement, as at Fig. 2. By causing the work to bear partly upon one bow and partly upon the other the stress is fairly distributed and the pivot is saved from undue pressure, thus contributing to the long life of the dog. A further advantage is gained, because in setting the dog for small sizes of work the bows form an ellipse, as at Fig. 2, and the set-screw is enabled to clamp the work effectually against the sides of the ellipse, which form a V where they receive the work.

As will be seen at Fig. 5, the bow 1 is slotted at 12 to form a yoke, into which is inserted a tongue 13, formed upon the end of the other bow. The pivot or pintle 3 is preferably driven tightly into the perforated yoke, while the perforation 14 in the tongue is formed with flaring mouths, so that the bow 2 may not only pivot, but also tip, facewise with relation to the bow 2, as illustrated, so as to release the toothed portions of the bows from each other to enable the same to be set to different positions and reëngaged. Obviously any other form of universal-joint construction will answer the purpose. It will be understood from Figs. 1 and 2 not only that the dog is adapted to take in an extraordinary range of work, since the set of teeth upon each bow extends through a large arc, but also that very fine adjustments can be made, since the teeth may be small and comparatively fine without becoming impracticable because of weakness. Moreover, when holding heavy work it will be seen that the bows have many interlocking points, thus insuring rigidity of action under heavy loads.

It will be observed that the bow 1 is prolonged at 15 to enable the set of teeth to be lengthened for giving a good bearing and ample adjustment and also for increasing the area of the floor of the depression 8, thereby affording a broad bearing-surface for the other bow 2. The latter is also thickened, as at 16, between its teeth and its pivot to give broad bearing-surface for the work, the two bows lying substantially flush with each other, as at Fig. 1.

Variations may be resorted to within the scope of my invention, and portions of my improvements may be used without others.

Having thus described my invention, I claim—

1. A lathe-dog comprising a carrier-arm and a work-clamp, said clamp consisting of a pair of bows upon one of which said arm is formed, and each bow forming about half of an annulus, a pivot connecting said bows, a set-screw tapped into one of said bows in position to cause the work to bear against both of said bows, and coöperative ratchet-teeth upon said bows.

2. A lathe-dog comprising a carrier-arm and a work-clamp, said clamp consisting of a pair of bows upon one of which said arm is formed, and each bow forming about half of an annulus, a pivot connecting said bows, a set of internal ratchet-teeth formed upon said carrier-arm bow, a set of coöperating spur or external ratchet-teeth formed upon the other bow, and a set-screw upon one of said bows in position to clamp the work against both of said bows.

3. A lathe-dog comprising a carrier-arm and a work-clamp, said clamp consisting of a pair of bows upon one of which said arm is formed, and each bow forming about half of an annulus, a pivot connecting said bows, a set of internal ratchet-teeth formed upon said carrier-arm bow, a set of coöperating spur or external ratchet-teeth formed upon the other bow, and a set-screw tapped into the last-mentioned bow near said pivot.

4. A lathe-dog comprising a carrier-arm and a work-clamp, said clamp consisting of a pair of bows upon one of which said arm is formed, a pivot connecting said bows, a set-screw tapped into one of said bows in position to cause the work to bear against both of said bows, an internal set of teeth formed upon the free end of said carrier-arm bow, and a coöperative set of spur-teeth formed upon the free end of the other bow; said pivot having the construction of a universal joint, to permit movement of the bows in facewise direction, to enable disengagement of one from the other and relative readjustment and reëngagement.

5. A lathe-dog comprising a carrier-arm and a work-clamp, said clamp consisting of a pair of bows upon one of which said arm is formed, a pivot connecting said bows, and a set-screw tapped into one of said bows in position to cause the work to bear against both of said bows: said bow upon which said arm is formed having a depression for receiving the free end of the other bow, the latter being provided with spur-teeth, and the wall of said depression being formed with internal teeth which coöperate with said spur-teeth.

6. A lathe-dog comprising a carrier-arm and a work-clamp, said clamp consisting of a pair of bows upon one of which said arm is formed, a pivot connecting said bows, and a set-screw tapped into one of said bows in position to cause the work to bear against both of said bows; one of said bows having a depression for receiving the free end of the other bow, and the wall of said depression being formed with a set of internal teeth; and said other bow having a coöperating set of spur-teeth formed upon its free end, and having between said teeth and said pivot a thickened body for affording ample bearing-surface for the work.

7. A lathe-dog comprising a carrier-arm and a work-clamp, said clamp consisting of a pair of bows upon one of which said arm is formed, each bow forming about half of an annulus, and a pivot connecting said bows; and a set-screw tapped into the bow which is unprovided with said arm, in position to cause the work to bear against both of said bows; the bow upon which said arm is formed having a depression for receiving the free end of the other bow, and the wall of said depression being formed with a set of internal ratchet-teeth; said other bow having a coöperating set of spur ratchet-teeth formed upon its free end, and having between said teeth and said pivot a thickened body for affording ample bearing-surface for the work; said pivot having a universal-joint construction, to permit facewise movement of the bows for disengaging one set of teeth from the other.

Signed at New York, N. Y., this 6th day of August, 1903.

THOMAS C. PATTERSON.

Witnesses:
ANTHONY C. DURSCHANG,
HANNAH BESTHOFF.